United States Patent
Yoshikawa

(10) Patent No.: US 6,770,251 B2
(45) Date of Patent: Aug. 3, 2004

(54) EXHAUST GAS PURIFYING CATALYST

(75) Inventor: Tatsuya Yoshikawa, Himeji (JP)

(73) Assignees: ICT. Co., Ltd., Osaka (JP); International Catalyst Technology, Inc., Ridgefield Park, NJ (US)

( * ) Notice: Subject to any disclaimer, the term of this patent is extended or adjusted under 35 U.S.C. 154(b) by 149 days.

(21) Appl. No.: 09/888,009

(22) Filed: Jun. 22, 2001

(65) Prior Publication Data

US 2002/0016259 A1 Feb. 7, 2002

(30) Foreign Application Priority Data

Jun. 28, 2000 (JP) .................................. 2000-195143

(51) Int. Cl.$^7$ ...................... C01B 21/00; B01J 29/00; B01J 29/08; B01J 29/18; B01J 23/32
(52) U.S. Cl. ................... 423/239.1; 502/73; 502/74; 502/77; 502/78; 502/79; 502/324; 502/349
(58) Field of Search ................... 423/239.1; 502/73, 502/74, 77, 78, 79, 349, 324

(56) References Cited

U.S. PATENT DOCUMENTS

| 5,041,272 A | * | 8/1991 | Tamura et al. ............... 423/239 |
| 5,155,077 A | * | 10/1992 | Montreuil et al. ............. 502/66 |
| 5,312,608 A | * | 5/1994 | Hayasaka et al. ......... 423/213.5 |
| 5,328,672 A | | 7/1994 | Montreuil et al. ........... 423/212 |
| 5,911,960 A | * | 6/1999 | Miyoshi et al. ........... 423/213.5 |

FOREIGN PATENT DOCUMENTS

| EP | 0 365 308 A2 | 4/1990 | ........... B01D/53/36 |
| JP | A-2-107315 | 4/1990 | |
| JP | A-8-108043 | 4/1996 | |
| JP | A-10-24238 | 1/1998 | |
| WO | WO 93/04767 | 3/1993 | ........... B01D/53/36 |

* cited by examiner

Primary Examiner—Stanley S. Silverman
Assistant Examiner—Jonas N. Strickland
(74) Attorney, Agent, or Firm—Fish & Richardson P.C.

(57) ABSTRACT

A catalyst is provided that is capable of efficiently purifying $NO_x$ contained in a lean atmosphere containing moisture. The exhaust gas purifying catalyst contains a composition obtained by physically mixing a composite oxide containing zirconium and manganese and/or cobalt with a zeolite.

20 Claims, No Drawings

EXHAUST GAS PURIFYING CATALYST

BACKGROUND OF THE INVENTION

1. Field of the Invention

This invention relates to a catalyst for purifying exhaust gases emitted from an internal combustion engine or a boiler and a method for purifying the exhaust gas by the use of this catalyst. More specifically, it relates to an exhaust gas purifying catalyst capable of removing in high efficiency nitrogen oxides ($NO_x$) in the lean atmosphere containing moisture and a method for purifying the $NO_x$ by the use of this catalyst.

2. Description of Related Art

The $NO_x$ emitted from internal combustion engines is a causal substance for acid precipitation and photochemical smog. In recent years, developing a means for decreasing $NO_x$ emission has been desired by the social consensus voiced about the environmental preservation. Though the purification or decomposition of $NO_x$ under an oxygen-excess atmosphere by catalytic method has been energetically studied since a long time ago, it has not been easy to discover an effective technique.

Titania-carried vanadium catalysts using ammonia as a reducing agent have been established as the technique for purifying $NO_x$. It has been already put to practical use such as in large stationary sources for generation, but the effort to mount the systems has not yet been realized in mobile sources such as diesel cars on account of issues like slipping of unreacted ammonia.

In the circumstance, it was found to be effective for $NO_x$ purification to apply copper ion-exchanged zeolite using hydrocarbon as a reducing agent. With this discovery, zeolite based catalyst systems have been proposed in JP-A-63-100919 and JP-A-4-363146.

SUMMARY OF THE INVENTION

These catalysts, however, have entailed problems such as being still low selectivity at steady state or readily incurring deterioration under the influence of moisture.

This invention has been done in view of the affairs mentioned above and provides a catalyst capable of purifying, with high efficiency, $NO_x$ contained in the lean atmosphere in the presence of a hydrocarbon, and a method for the purification of $NO_x$ in exhaust gases by the use of the catalyst.

The object is accomplished by a catalyst with the composition formed by an intimate contact of zeolite and an oxide made from the complex of zirconium and manganese and/or cobalt in particularly like physical mixing.

The object is further accomplished by a method for the purification of $NO_x$ in exhaust gases by the use of the catalyst.

According to this invention, it is possible to provide a catalyst with the composition formed by an intimate contact of zeolite and an oxide made from the complex of zirconium and manganese and/or cobalt in particularly like physical mixing and that is capable of efficiently removing $NO_x$ in an oxygen-excess atmosphere containing moisture.

The above and other objects, features and advantages of the present invention will become clear from the following description of the preferred embodiments.

DETAILED DESCRIPTION OF THE PREFERRED EMBODIMENTS

We have pursued a diligent study with a view to solving the problem mentioned above, and found that a composition obtained by physically mixing a composite oxide containing zirconium and manganese and/or cobalt (a first component) and zeolite (a second component) has a specifically high performance as a $NO_x$ purifying catalyst in a lean atmosphere when it is applied with reducing agents such as hydrocarbon. This invention has been achieved.

Specifically, the first component alone or the second component alone does not purify $NO_x$ (less than 15% at normal operating conditions), but the first and second components, when contacted closely to each other like a method of physical mixing, prominently reveal the catalytic function of reducing $NO_x$, under oxygen-excess atmosphere. When the active component of the catalyst is applied to a monolithic carrier, which is generally used in an automobile catalyst, it is commendable for this active component to be applied in a homogenous physical mixture so as to manifest the performance to the greatest possible extent. When the individual components of the catalyst are applied as different layers, the catalyst is still effective. Though the detail of the reaction is not known, it may say that the two components of the catalyst work synergetically for $NO_x$ reduction. For example, the first component may work for the oxidation of NO and hydrocarbon, and the second component may work for the activation of hydrocarbon and $NO_2$. The catalytic activity is high at steady state when compared with Cu-ZSM5 as later shown in examples (temperature decrease test). Therefore the present invention is different from the system already found zeolite-based catalyst like Cu-ZSM5, Mn-ZSM5 and so on.

The first component is not particularly restricted but only required to be a composite oxide containing zirconium and manganese and/or cobalt. The composite oxide, when analyzed by the X-ray diffraction, shows a discernible peak of $ZrO_2$ and does not show a discernible peak solely of oxides of Mn or Co. Thus, the first component is to be understood that Mn and/or Co is essentially complexed with $ZrO_2$.

The weight ratio of manganese and/or cobalt to zirconium is not restricted but only required to be enough for the produced catalyst to acquire an ability to reduce $NO_x$. The weight ratio of each of the oxides may comprise from 1 to 50 weight parts, preferably from 5 to 40 weight parts, per 100 weight parts of zirconiumoxide. If this ratio drops below 1 weight part, the shortage will be at a disadvantage in preventing a satisfactory ability to reduce $NO_x$. Conversely, if the ratio exceeds 50 weight parts, the excess will be at a disadvantage in bringing the ability to reduce $NO_x$ proportionately thereto. Instead of zirconium oxide, complex oxides containing zirconium oxide such as a cerium-zirconium oxide, which is widely applied as the three-way catalyst component, and manganese and/or cobalt may be cited.

The method for preparing the composite oxide containing zirconium and manganese and/or cobalt is not restricted. The preparation may be effected by any methods well known to an ordinary skill in the art, such as a co-precipitation, a sol-gel, or an impregnation method. In the impregnation method, for example, the preparation is attained by impregnating powdered zirconium oxide with a solution of the raw material salt such as a nitrate, an acetate, or an oxalate of manganese and/or cobalt, drying the impregnated powder at a temperature of 100° C. to 250° C., and then calcining the dried powder at a temperature of 300° C. to 800° C., preferably of 400° C. to 700° C. The atmosphere during the calcinations is not restricted, but air may be cited. Though the kind of zirconium oxide to be used at this time is not particularly discriminated, the surface area of the zirconium oxide (as determined by the BET method) may comprise not less than 5 m²/g, preferably not less than 20 m²/g, and especially in the range of 20 to 200 m²/g.

The first component may be deposited on a refractory inorganic substance such as silicon carbide, alumina, titania, or silica. This deposition is attained by impregnating the substance in a powdery state with the solution of a raw material salt such as a nitrate, acetate, or oxalate of zirconium and manganese and/or cobalt, drying the impregnated powder, and calcining the dried powder.

Further, the first component may incorporate therein some other element, for example, as an oxide, such as at least one element selected from the group consisting of bismuth, iron, cerium, praseodymium, gadolinium, lanthanum, barium, strontium, calcium, potassium, cesium, and yttrium. Commendably, the amount of such an element may comprise from 0.2 to 50 weight percent, preferably from 1 to 40 weight percent, based on the weight of manganese and/or cobalt (weight as metal). By having this element participate in the complex, it is possible to increase the efficiency of $NO_x$ purification and to improve the produced catalyst in thermal stability.

The second component is a family of zeolite, not restricted, but may include ZSM-5, Ferrierite, Faujasite, β-zeolite, and Mordenite. These are usually crystalline aluminosilicate The zeolite is a material that has specific pore structure and solid acid property. It has been suggested that for this invention, this quality of the material is indispensable for purifying $NO_x$. To be specific, the zeolite having proper pore structure and acid strength and/or amount is essential for the catalyst of this invention.

The acid amount of the zeolite is generally expressed by the atomic ratio of Si and Al, which are components of the zeolite. For a fixed structure, it is said that in proportion as the content of Al thereof increases the acid amount of the zeolite increases. For the zeolite to be used in this invention, it is essential to have a proper amount of acidity. The Si/Al ratio of this zeolite is properly in the range of 1 to 150:1, preferably in the range of 5 to 80:1. Among other conceivable types of zeolite, the proton type zeolite proves particularly advantageous. It may be partly modified with iron, cerium, lanthanum, phosphorus, boron, gallium, magnesium, calcium and mixtures thereof or preferably with cerium, lanthanum, phosphorus, boron or mixtures thereof. The term "modification" as used herein means the introduction of a new element by a method such as ion exchange, impregnation, or exchange of skeleton Al ion. This modification is possible to alter the acid characteristics of the zeolite and improve the heat resistant property and durability. The zeolite may also be modified with the following component, namely copper, cobalt and manganese up to 0.5 weight percent, preferably up to 0.3 weight percent, based on the weight of the zeolite. This is for the modification of zeolite to remove residues such as carbon deposited in the zeolite pores during use. If the content exceeds the above-defined value, the catalyst behaves for the reaction like the Cu-zeolite catalyst, namely exhibits low selectivity at steady state condition, which is shown below in Referential Example 1 as a conversion of the temperature decrease test.

Since the pore structure is specified by the basic structure and skeleton of the zeolite and effects the interaction with a hydrocarbon, the zeolite preferably has a structure that fits the hydrocarbon to be used. The zeolite to be used in this invention is preferred to be ZSM-5, ferrierite, faujasite, β-zeolite, or mordenite where a hydrocarbon such as propylene, ethylene, decane or a light oil is used as the reducing agent or particularly preferred to be ZSM-5, mordenite or β-zeolite.

The composite oxide containing zirconium and manganese and/or cobalt (the first component) is physically mixed with zeolite (the second component). The term "physical mixture" as used herein means the simple mixture of the first and second components without inducing any chemical linkage. Examples of the method for affecting this physical mixture may include methods that comprise dispersing these components of independent weights into a medium such as water and mixing the resultant dispersions and that comprise shaking the two components together till they form a homogeneous mixture.

The weight ratio (for mixture) of the first and second components mentioned above, i.e. first component/second component, though not particularly restricted, is generally in the range of 0.05 to 2.0:1, preferably in the range of 0.1 to 0.7:1. If this weight ratio drops below 0.05, the shortage will be at a disadvantage in preventing the produced catalyst from acquiring a satisfactory activity in high space velocity conditions. Conversely, if the weight ratio exceeds 2.0, the excess will be at a disadvantage in not obtaining the $NO_x$ reducing property proportionately to the amount of the components added, since the activity balance of the first and second components is broken. In the present catalyst system, there is a point suitable for $NO_x$ purification between the reaction activity of the first component such as oxidation activity and the reaction activity of the second component such as acid strength and/or acid amount of zeolite.

Though the composition resulting from the physical mixture of the first and second components may be used in its unmodified form, it is preferably used in the form of a coat formed on a refractory three-dimensional structure in the case of purifying exhaust gases from a motorcar. Examples of the structure may include pellets and a monolithic carrier. The monolithic carrier is preferred over the pellets in respect of the smallness of the pressure loss. As the monolithic carrier, what is generally called a honeycomb carrier can be used. Particularly, the honeycomb carriers using cordierite, mullite, α-alumina, zirconia, titania, titanium phosphate, aluminum titanate, spondumene, aluminosilicate, and magnesium silicate as materials prove advantageous. Among other honeycomb carriers, those made of cordierite prove particularly favorable. Besides, integral structures using oxidation proof heat resistant metals such as stainless steel and Fe—Cr—Al alloys may be usable.

Such a monolithic carrier is produced by an extrusion molding method or a method that consists in tightly reeling a sheet like element into a roll, for example. The openings in the carrier for passing the gas (cells) may be shaped like a hexagon, a tetragon, a triangle, or a corrugation, whichever fits the occasion best. The cell density (number of cells per cross section of 6.45 cm²) is not particularly restricted but may cited in the range of 100 to 1200 cells, preferably in the range of 200 to 600 cells, in view of the coatability of slurry and the durability of coat.

In this invention, the method for depositing the composition resulting from physical mixture of the first and second components on the structure is not particularly discriminated. An ordinary impregnation method can be used. To be specific, this impregnation is attained by immersing the structure in a slurry obtained by physically mixing the first and second components, straining the impregnated structure to expel excess slurry, then drying the wet structure at a temperature of 80° C. to 250° C., preferably of 100° C. to 150° C., and optionally calcining the dried structure at a temperature of 300° C. to 800° C., preferably of 400° C. to 600° C., for a period of 0.5 to 3 hours, preferably of 1 to 2 hours.

The amount of the composition to be deposited on the structure is not particularly restricted, but generally in the range of 100 to 400 g, preferably 150 to 300 g, per liter of the structure. If this amount drops below 100 g, the shortage will be at a disadvantage in lowing $NO_x$ reducing capacity. Conversely, if the amount exceeds 400 g, the excess will be at a disadvantage in imparting increased resistance to the cells and aggravating the pressure loss during use.

One of the features of the invention is that the catalyst exhibits similar activity in the programmed temperature decrease test, as set forth below, as in the programmed temperature increase test, thereby exhibiting high $NO_x$ conversions constantly. Another feature of the invention is that the catalyst has ability for adsorbing and/or storing $NO_x$ in low temperatures, thereby providing a catalyst system using this catalyst.

The catalyst obtained as described above can purify $NO_x$ by utilizing, as a reducing agent, the hydrocarbon such as propylene, methane, propane, lamp oil, light oil, heavy oil contained in the atmosphere; the unburnt fuel of an internal combustion engine such as a gasoline or diesel engine; or ammonia. Particularly, it can efficiently purify the $NO_x$ that is contained in the gas entraining excess oxygen and moisture. When the amount of the reducing agent is not sufficient and the $NO_x$ is not reduced sufficiently, a reducing agent mentioned above may be properly added from the exterior of system. The term "excess oxygen" as used herein means that the amount of oxygen contained in the gas is larger than the amount of oxygen sufficient for oxidizing the components. To be specific, it means that the oxygen is contained usually in an amount of 1 of 20 vol. %, based on the volume of the exhaust gas. The expression that the moisture is contained means the atmosphere that contains moisture in the approximate range of 3 to 15%, based on the volume of the exhaust gas.

As exemplified as set forth below, the catalyst of the present invention can be used for the purification of $NO_x$ in the range of 200° C. to 600° C., preferably 250° C. to 500° C.

Examples of the gas to be treated may include $NO_x$-containing exhaust gases emitted from the internal combustion engine using gasoline as the fuel and emitted from the internal combustion engine using light oil or LPG as the fuel. The catalyst manifests an excellent $NO_x$ purifying capacity, particularly in the atmosphere of a large air-fuel ratio (lean), which is held to permit purification only with difficulty, the air-fuel ratio (A/F) being so large as to be not less than 15.

EXAMPLES

Now, this invention will be described more specifically below with examples. It should be noted, however, that this invention is not limited by these examples.

The zeolite used in Examples is of proton type unless otherwise stated.

Example 1

One thousand (1000) g of zirconium oxide was impregnated with an aqueous solution containing a 100 g equivalent of manganese nitrate as manganese oxide ($MnO_2$), dried overnight at 120° C., and calcined at 550° C. for one hour. The resultant manganese-deposited zirconium oxide and ZSM-5 (Si/Al=27, available from Zeolyst International) were separately ball milled in an aqueous solution, and mixed at a weight ratio (solid ratio) of 2:8. The produced mixture was applied to a monolith made of cordierite (400 cells, 0.043 liter, available from NGK Insulators, LTD in Japan) so as to account for an amount of 180 g/L. The coated monolith thus obtained was dried at 120° C. and then calcined at 500° C. for one hour to obtain a catalyst.

In the reaction gas shown in Table 1, the produced catalyst was heated from 100° C. to 550° C. at an increasing rate of 20° C. /min. and cooled from 550° C. to 150° C. at a decreasing rate of 20° C. /min. to determine conversion efficiencies of $NO_x$. The results are shown in Table 2 below.

TABLE 1

CONDITIONS OF REACTION GAS
Conditions for rating model gas

NO: 400 ppm,
Propylene (n-decane only in Example 6): 1800 ppm Cl (normalized to carbon concentration),
CO: 400 ppm, $O_2$: 8.5 vol %, Water: 10 vol %
Total flow volume: 28 L/min., SV: About 40,000 $h^{-1}$ NO was analyzed with a chemical emission spectral analyzer (CLD), and the hydrocarbon with a hydrogen flame ionizing analyzer (NDIR), respectively.

Comparative Example 1

A catalyst was prepared according to the procedure of Example 1 while using γ-alumina instead of the zirconium oxide.

Comparative Example 2

A catalyst was prepared according to the procedure of Example 1 while using silica-alumina of Si/Al=0.2 instead of the ZSM-5.

Comparative Example 3

A catalyst was prepared according to the procedure of Example 1 while using silicalite (Si/Al=300) instead of the ZSM-5.

Example 2

A catalyst was prepared according to the procedure of Example 1 while adding a 40 g equivalent of cerium nitrate as cerium oxide ($CeO_2$) besides the manganese nitrate.

Example 3

A catalyst was prepared according to the procedure of Example 2 while using mordenite (Si/Al=10, available from Zeolyst International) instead of the ZSM-5.

Example 4

A catalyst was prepared according to the procedure of Example 1 while using cobalt nitrate instead of the manganese nitrate.

Example 5

An aqueous solution of a 15% equivalent of manganese nitrate as manganese oxide ($MnO_2$) and an aqueous solution of a 15% equivalent of zirconium oxynitrate as zirconium oxide ($ZrO_2$) were added to a commercially available alumina (150 $m^2$/g). They were stirred together. The resultant mixture was adjusted to a pH of 9 by addition of 28% aqua ammonia to form a precipitate by the co-precipitation method. It was filtered to separate the mixture of alumina and the precipitate, washed, then dried overnight at 120° C., and calcined at 500° C. for one hour. The resultant product and ZSM-5 (Si/Al=27, available from Zeolyst International) were ball milled in an aqueous solution and mixed at a weight ratio of 4:6. The produced mixture was applied to a monolith (supra) so as to account for a ratio of 180 g/L.

Example 6

The catalysts were rated for performance according to the procedure of Example 3 while using n-decane instead of the propylene as the reducing agent.

REFERENTIAL EXAMPLE 1

An aqueous copper nitrate solution was adjusted to pH 9 by the addition of aqua ammonia. ZSM-5 (Si/Al=27, supra) was then added into the solution and stirred for 3 hours for ion exchange. The suspension was filtered and the cake washed with water to remove unexchanged Cu. It was then dried at 120° C., and calcined at 500° C. for one hour. The resultant Cu-ZSM-5 material was analyzed to determine the deposition ratio of the copper. The ratio was estimated to be 1.8 wt. %, based on the weight analysis of the material by XRF (X-ray fluorescence).

This material was ball milled to disperse in an aqueous solution containing silica sol and the resultant dispersion was applied to the monolithic carrier (supra). The deposited dispersion was dried at 120° C. and then calcined at 500° C. for one hour to obtain a catalyst. The resulting catalyst had a coat of 200g per liter of catalyst, in which 180 g was based on the weight of Cu-ZSM-5 material and 20 g based on the weight of silica.

The catalysts obtained in the examples cited above were tested for performance by the method described in Example 1. The results are shown in Table 2.

TABLE 2

|  | Programmed temperature increase | | Programmed temperature decrease | |
| --- | --- | --- | --- | --- |
|  | NOx | | | |
|  | Tmax(° C.) | Conv.(%) | Tmax(° C.) | NOx Conv.(%) |
| Ex. 1 | 370 | 50 | 300 | 55 |
| Com. Ex. 1 | 460 | 15 | 410 | 20 |
| Com. Ex. 2 | 360 | 10 | 320 | 15 |
| Com. Ex. 3 | 380 | 20 | 300 | 15 |
| Ex. 2 | 380 | 70 | 280 | 75 |
| Ex. 3 | 330 | 80 | 290 | 85 |
| Ex. 4 | 390 | 60 | 230 | 45 |
| Ex. 5 | 390 | 50 | 300 | 50 |
| Ex. 6 | 380 | 85 | 290 | 88 |
| 1* | 420 | 60 | 450 | 30 |
| Ex. 9 | 365 | 45 | 295 | 50 |

Tmax: Catalyst inlet temperature at which the conversion efficiency of $NO_x$ reached the maximum.
$NO_x$ Conv: The conversion efficiency of $NO_x$ at Tmax.
1*: REFERENTIAL EXAMPLE 1

Example 7

The catalyst prepared in Example 3 was left standing at 700° C. for 50 hours in a reaction gas of the conditions shown in Table 1 to determine the durability under the influence of the standing. The results are shown in Table 3.

Example 8

A catalyst was prepared according to the procedure of Example 7 while using, during the preparation of the catalyst, what was obtained by impregnating mordenite (Si/Al=10, available from Zeolyst International) with 0.3 weight % each of magnesium, phosphorus, and cerium. The catalyst was tested for durability by the procedure described in Example 7 and then tested for performance by the procedure described in Example 1. The results are shown in Table 3.

TABLE 3

| (Durability) | | | | |
| --- | --- | --- | --- | --- |
|  | Programmed temperature increase | | Programmed temperature decrease | |
|  | NOx | | | |
|  | Tmax(° C.) | Conv.(%) | Tmax(° C.) | NOx Conv.(%) |
| Ex. 7 | 350 | 70 | 300 | 75 |
| Ex. 8 | 330 | 80 | 290 | 85 |

Tmax: Catalyst inlet temperature at which the conversion efficiency of $NO_x$ reached the maximum.
$NO_x$ Conv: The conversion efficiency of $NO_x$ at Tmax.

Example 9

ZSM-5 powder was ball milled in an aqueous solution and then applied to a monolith carrier (supra) to account for a ratio of 144 g/L. The resulting ZSM-5 coated monolith was dried and then calcined at 500° C. for one hour.

The manganese-deposited zirconia powder, prepared according to the procedure of Example 1, was ball milled and then applied to the calcined monolith to account for a ratio of 36 g/L. The resulting monolith was dried and calcined at 500° C. for one hour. The total amount of the coated materials was 180 g/L with the second coat/ the first coat being 2/8.

The test result is shown in Table 2 above.

The catalysts of this invention excel not only in the fresh state but also in the state assumed after the standing (Examples 7 and 8), in terms of the conversion of $NO_x$ at Tmax in the programs of temperature increase and temperature decrease, compared with the fresh catalysts obtained in the comparative examples (Comparative Examples 1 to 3).

The entire disclosure of Japanese Patent Application No. 2000-195143filed on Jun. 28, 2000 including specification, claims and summary are incorporated herein by reference in its entirety.

What is claimed is:

1. An exhaust gas purifying catalyst comprising:
   a composition including a first catalytic component of a composite oxide containing zirconium and manganese and/or cobalt and a second catalytic component of zeolite; wherein the zeolite is a proton zeolite or is modified with at least one element selected from the group consisting of cerium, lanthanum, phosphorus, boron, gallium, magnesium, and mixtures thereof.

2. A catalyst according to claim 1, wherein the composite oxide and the zeolite are in the state of a physical mixture.

3. A catalyst according to claim 1, wherein the first and second components are deposited on a monolithic carrier as a homogeneous physical mixture or as separated layers.

4. A catalyst according to claim 1, wherein a weight ratio of the manganese and/or the cobalt to the zirconium comprise from 1 to 50 weight parts as oxide per 100 weight parts of the zirconium oxide.

5. A catalyst according to claim 4, wherein the weight ratio of the manganese and/or the cobalt to the zirconium comprise from 5 to 40 weight parts as oxide per 100 weight parts of the zirconium oxide.

6. A catalyst according to claim 1, wherein a first component/second component ratio is in the range of 0.05 to 2.0:1 by weight.

7. A catalyst according to claim 6, wherein the first component/second component ratio is in the range of 0.1 to 0.7:1 by weight.

8. A catalyst according to claim 1, wherein the first component has the manganese and/or cobalt deposited on the zirconium oxide.

9. A catalyst according to claim 1, wherein the first component is further deposited on a refractory inorganic substance.

10. A catalyst according to claim 1, wherein the second component is a proton zeolite.

11. A catalyst according to claim 10, wherein the zeolite is at least one member selected from the group consisting of ZSM-5, Ferrierite, Faujasite, β-zeolite, Mordenite and mixtures thereof.

12. A catalyst according to claim 1, wherein the second component is a zeolite modified with at least one element selected from the group consisting of cerium, lanthanum, phosphorus, boron, gallium, magnesium, and mixtures thereof.

13. A catalyst according to claim 1, wherein the first component further contains at least one element selected from the group consisting of bismuth, iron, cerium, praseodymium, gadolinium, lanthanum, barium, strontium, calcium, cesium, yttrium and mixtures thereof.

14. A catalyst according to claim 13, wherein an amount of the element comprise from 0.2 to 50 weight percent based on the weight of the manganese and/or the cobalt, as reduced to weight of the metal.

15. A catalyst according to claim 14, wherein an amount of the element comprise from 1 to 40 weight percent based on the weight of the manganese and/or the cobalt, as reduced to weight of the metal.

16. A catalyst according to claim 13, wherein the zeolite is modified with at least one element selected from the group consisting of cerium, lanthanum, gallium, magnesium, and mixtures thereof.

17. A catalyst according to claim 1, wherein the zeolite is partly modified with at least one element selected from the group consisting of cerium, lanthanum, phosphorus, boron, gallium, magnesium, and mixtures thereof.

18. A catalyst according to claim 1, wherein the zeolite is modified with at least one element selected from the group consisting of cerium, lanthanum, gallium, magnesium, and mixtures thereof.

19. A method for purifying $NO_x$ in an exhaust gas by using a catalyst, catalyst comprising: a composition comprising a first catalytic component of composite oxide containing zirconium and manganese and/or cobalt and a second catalytic component of zeolite in the state of a physical mixture;
wherein the zeolite is a proton zeolite or is modified with at least one element selected from the group consisting of cerium, lanthanum, phosphorus, boron, gallium, magnesium, and a mixture thereof.

20. A method according to claim 19, wherein the exhaust gas is from a diesel engine or lean burn engine.

* * * * *